United States Patent
Donaldson

(10) Patent No.: US 11,047,378 B2
(45) Date of Patent: Jun. 29, 2021

(54) SYSTEMS AND METHODS FOR PUMP SLIP SENSING

(71) Applicant: Carlisle Fluid Technologies, Inc., Scottsdale, AZ (US)

(72) Inventor: Eric Julius Donaldson, Saint Paul, MN (US)

(73) Assignee: Carlisle Fluid Technologies, Inc., Scottsdale, AZ (US)

( * ) Notice: Subject to any disclaimer, the term of this patent is extended or adjusted under 35 U.S.C. 154(b) by 347 days.

(21) Appl. No.: 16/040,524

(22) Filed: Jul. 19, 2018

(65) Prior Publication Data

US 2019/0024655 A1 Jan. 24, 2019

Related U.S. Application Data

(60) Provisional application No. 62/535,535, filed on Jul. 21, 2017.

(51) Int. Cl.
*F04B 51/00* (2006.01)
*F04B 49/06* (2006.01)
(Continued)

(52) U.S. Cl.
CPC .............. *F04B 51/00* (2013.01); *F04B 15/00* (2013.01); *F04B 19/04* (2013.01); *F04B 23/04* (2013.01); *F04B 49/065* (2013.01); *F04D 15/0088* (2013.01); *G01F 1/36* (2013.01); *G01F 1/363* (2013.01); *G01F 1/50* (2013.01);
(Continued)

(58) Field of Classification Search
CPC ..... G01F 1/50; G01F 1/36; G01F 1/42; G01F 1/363; F04D 15/0088; F05B 2270/3013; F05B 2270/3011; F05B 2260/83; F04B 19/04; F04B 49/065; F04B 51/00;
(Continued)

(56) References Cited

U.S. PATENT DOCUMENTS

| 4,358,821 A | 11/1982 | Niemi |
| 6,126,392 A | 10/2000 | Sabini |

(Continued)

FOREIGN PATENT DOCUMENTS

| CN | 201588753 U | 9/2010 |
| CN | 106855429 A | 6/2017 |

(Continued)

OTHER PUBLICATIONS

T. Voldent et al., Portable Systems for Metered Dispensing of Aggressive Liquids, SLAS Technology, 2018 Society for Laboratory Automation and Screening, vol. 23(5), pp. 470-475; Automation and Screening DOI: 10.1177/2472630318775316j (Year: 2018).*

(Continued)

*Primary Examiner* — Mischita L Henson
(74) *Attorney, Agent, or Firm* — Fletcher Yoder, P.C.

(57) ABSTRACT

A system includes a fluid pump and a first pressure sensor disposed on or near an inlet of the fluid pump. The system further includes a second pressure sensor disposed on or near an outlet of the fluid pump and a control system. The control system includes a processor configured to receive a first signal from the first pressure sensor. The processor is further configured to receive a second signal from the second pressure sensor, and to derive a pump slip measure based on the first signal and the second signal.

15 Claims, 3 Drawing Sheets

(51) Int. Cl.
  *F04D 15/00* (2006.01)
  *G01F 1/36* (2006.01)
  *F04B 23/04* (2006.01)
  *G01F 1/50* (2006.01)
  *F04B 15/00* (2006.01)
  *F04B 19/04* (2006.01)

(52) U.S. Cl.
  CPC ... *F04B 2201/0208* (2013.01); *F04B 2205/01* (2013.01); *F04B 2205/05* (2013.01); *F05B 2260/83* (2013.01); *F05B 2270/3011* (2013.01); *F05B 2270/3013* (2013.01)

(58) Field of Classification Search
  CPC .. F04B 2205/01; F04B 15/00; F04B 2205/05; F04B 23/04; F04B 2201/0208
  See application file for complete search history.

(56) References Cited

U.S. PATENT DOCUMENTS 9,581,475 B2 * 2/2017 Johnson ................... G01F 1/74

2003/0047008 A1 3/2003 Gopalakrishnan et al.
2016/0107179 A1 4/2016 McAndrew et al.

FOREIGN PATENT DOCUMENTS

DE 10359726 A1 7/2005
EP 0674154 A1 9/1995
JP H0255886 A 2/1990

OTHER PUBLICATIONS

Invitation to Pay Additional Fees for PCT Application No. PCT/US2018/043177 dated Oct. 10, 2018, 12 pgs.
International Search Report and Written Opinion for PCT Application No. PCT/US2018/043177 dated Dec. 4, 2018, 19 pgs.
Chinese Office Action for CN Application No. 201880059374.7, dated Apr. 21, 2021, 6 pgs.
Japanese Office Action for JP Application No. 2020-502565, dated Feb. 16, 2021, 3 pgs.

* cited by examiner

SYSTEMS AND METHODS FOR PUMP SLIP SENSING

CROSS REFERENCE TO RELATED APPLICATIONS

This application claims priority from and the benefit of U.S. Provisional Application Ser. No. 62/535,535, entitled "SYSTEM AND METHOD FOR PUMP SLIP SENSING," filed Jul. 21, 2017, which is hereby incorporated by reference in its entirety for all purposes.

Fluid pumps, such as centrifugal pumps, may include impeller systems that may be used to convert rotational energy into hydrodynamic energy suitable for transporting fluids. A fluid may enter a pump impeller along at or near to a rotating axis and may then be accelerated by the pump impeller, flowing radially outward into a diffuser or volute chamber (casing), from where the fluid may exit. Other fluid pump types, such as positive displacement pumps, likewise may convert mechanical energy into hydrodynamic energy. Fluid pumps may experience a reduction in capacity versus their theoretical volumetric displacement. This reduction in capacity is often called the "slip" or "slip factor". It may be useful to improve slip factor detection and measurement.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a fluid pump and a first pressure sensor disposed on or near an inlet of the fluid pump. The system further includes a second pressure sensor disposed on or near an outlet of the fluid pump and a control system. The control system includes a processor configured to receive a first signal from the first pressure sensor. The processor is further configured to receive a second signal from the second pressure sensor, and to derive a pump slip measure based on the first signal and the second signal.

In a second embodiment, a method includes receiving a first signal from a first pressure sensor, wherein the first pressure sensor is disposed on or near an inlet of the fluid pump. The method further includes receiving a second signal from a second pressure sensor, wherein the second pressure sensor is disposed on or near an outlet of the fluid pump. The method additionally includes deriving a pump slip measure based on the first signal and the second signal.

In a third embodiment, a tangible, non-transitory, computer-readable medium include instructions that when executed by a processor cause the processor to receive a first signal from a first pressure sensor, wherein the first pressure sensor is disposed on or near an inlet of the fluid pump. The instructions when executed by the processor further cause the processor to receive a second signal from a second pressure sensor, wherein the second pressure sensor is disposed on or near an outlet of the fluid pump. The instructions when executed by the processor additionally cause the processor to derive a pump slip measure based on the first signal and the second signal.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are directed to systems and methods that may detect a slip or a slip factor in fluid pumps. Due to design and/or wear characteristics, fluid pumps may experience a reduction in capacity vs. their theoretical volumetric displacement. This reduction is often called the "slip" or "slip factor". Slip may be caused by fluid that "leaks" from higher pressure portions of a pump to lower pressure portions of the pump.

A slip factor of 10%, for example, would indicate that the pump flow rate is only 90% of its theoretical capacity. Slip is generally quite high in centrifugal pumps as compared to positive displacement pumps. Slip is a function of pump speed, geometry, internal clearances between moving and stationary parts, and fluid properties (e.g. viscosity, density, lubricity, temperature). The techniques described herein may detect and measure slip indirectly (e.g., via pressure sensors) as opposed to using direct measures (e.g., via flow meters). Accordingly, the techniques described herein may provide for less invasive measurement in a more cost effective fashion, and may additionally be used with direct measurements, for example, to provide for slip measure redundancy.

Figure 1:
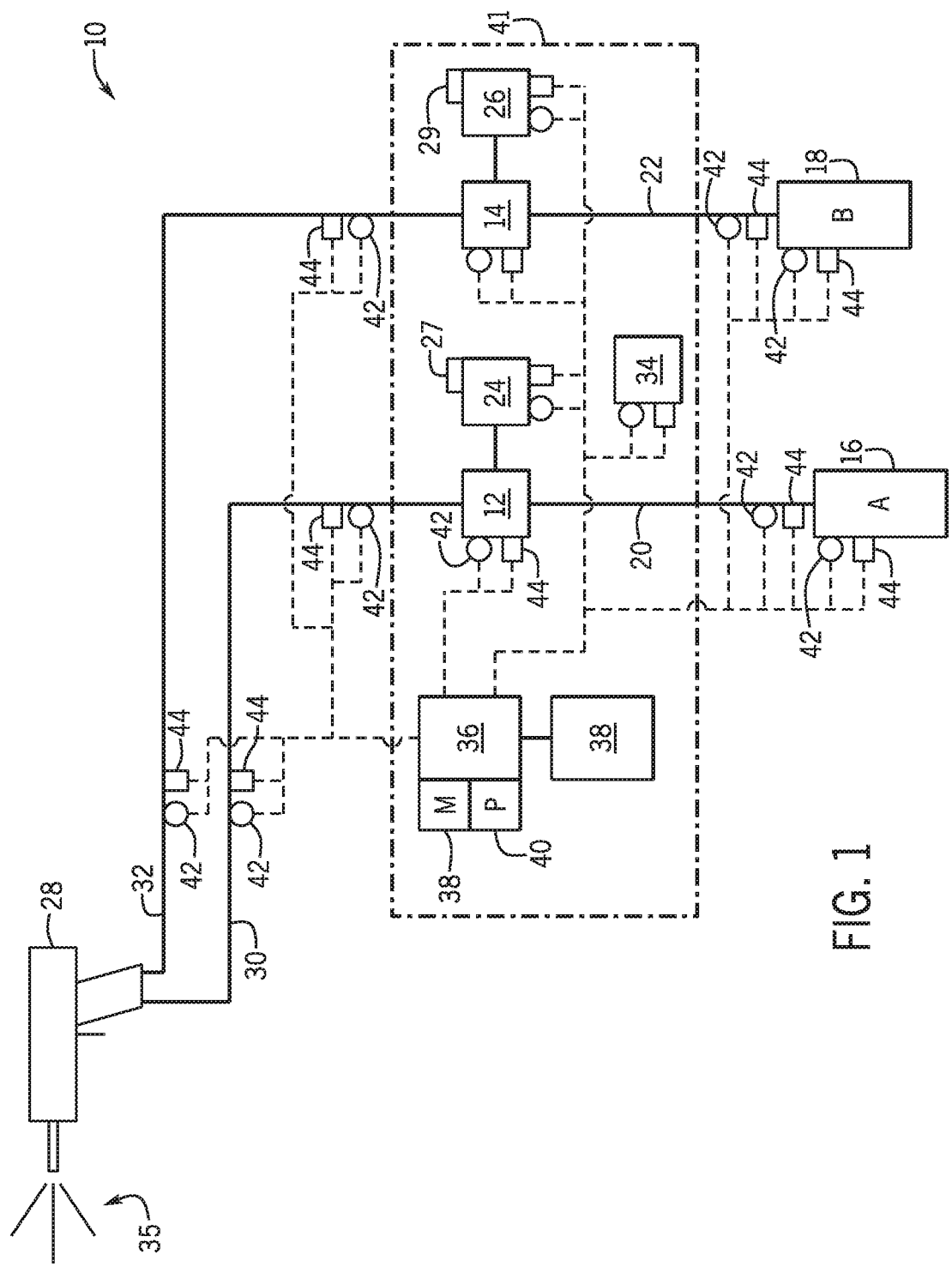
FIG. 1 is block diagram of an embodiment of a spray application system.

It may be useful to describe a system that may apply the pump slip or pump slip factor measurements described herein. Accordingly and turning now to FIG. 1, the figure is a block diagram illustrating an embodiment of a spray application system 10 that may include one or more liquid pumps 12, 14. The spray application system 10 may be suitable for mixing and dispensing a variety of chemicals, such as a chemicals used in applying spray foam insulation. In the depicted embodiment, chemical compounds A and B may be stored in tanks 16 and 18, respectively. The tanks 16 and 18 may be fluidly coupled to the pumps 12 and 14 via conduits or hoses 20 and 22. It is to be understood that while the depicted embodiment for the spray application system 10 shows two compounds used for mixing and spraying, other embodiments may use a single compound or 3, 4, 5, 6, 7, 8 or more compounds.

During operations of the spray application system 10, the pumps 12, 14 may be mechanically powered by motors 24, 26, respectively. The motors may be internal combustion engines (e.g., diesel engines), electric motors, pneumatic motors, or a combination thereof. Motor controllers 27 and 29 may be used to provide for motor start/stop, loading, and control based on signals transmitted, for example, from the processor 40. The motor 24 may be of the same type or of a different type from the motor 26. Likewise, the pump 12 may be of the same type or of different type from the pump 14. Indeed, the techniques described herein may be used with multiple pumps 12, 14, and multiple motors 24, 26, which may be of different types.

The pumps 12, 14 provide for hydrodynamic forces suitable for moving the compounds A, B into a spray gun system 28. More specifically, compound A may traverse the pump 12 through conduit 20 and then through a heated conduit 30 into the spray gun system 28. Likewise, compound B may traverse pump 14 through conduit 22 and then through a heated conduit 32 into the spray gun system 28. To heat the heated conduits 30, 32, a heating system 34 may be provided. The heating system 34 may provide for thermal energy, such as a heated fluid, suitable for pre-heating the compounds A and B before mixing and spraying and for heating the compounds A and B during mixing and spraying.

The spray gun system 28 may include a mixing chamber to mix the compounds A and B. For spray foam insulation applications, the compound A may include isocyanates while the compound B may include polyols, flame retardants, blowing agents, amine or metal catalysts, surfactants, and other chemicals. When mixed, an exothermic chemical reaction occurs and a foam 35 is sprayed onto a target. The foam then provides for insulative properties at various thermal resistance (i.e., R-values) based on the chemicals found in the compounds A and B.

Control for the spray application system 10 may be provided by a control system 36. The control system 36 may include an industrial controller, and thus include a memory 38 and a processor 40. The processor 40 may include multiple microprocessors, one or more "general-purpose" microprocessors, one or more special-purpose microprocessors, one or more application specific integrated circuits (ASICS), and/or one or more reduced instruction set (RISC) processors, or some combination thereof. The memory 38 may include a volatile memory, such as random access memory (RAM), and/or a nonvolatile memory, such as ROM, a hard drive, a memory card, a memory stick (e.g., USB stick) and so on. The memory 38 may include computer programs or instructions executable by the processor 40 and suitable for controlling the spray application system 10. The memory 38 may further include computer programs or instructions executable by the processor 40 and suitable for detecting pump 12, 14 slip and for providing control actions to ameliorate or eliminate the slip, as further described below.

The control system 36 may be communicatively coupled to one or more sensors 42 and operatively coupled to one or more actuators 44. The sensors 42 may include pressure sensors, flow sensors, temperature sensors, chemical composition sensors, speed (e.g., rotary speed, linear speed) sensors, electric measurement sensors (e.g., voltage, amperage, resistance, capacitance, inductance), level (e.g., fluid level) sensors, limit switches, and so on. The actuators 44 may include valves, actuatable switches (e.g., solenoids), positioners, heating elements, and so on.

A user or users may interface with the control system 36 via an input/output (I/O) system 38, which may include touchscreens, displays, keyboards, mice, augmented reality/virtual reality systems, as well as tablets, smartphones, notebooks, and so on. A user may input desired pressures, flow rates, temperatures, ratio between compound A and compound B, alarm thresholds (e.g., threshold fluid levels of compound A, B in tanks 16, 18), and so on. The user may then spray via the spray gun system 28 and the control system 36 may use the processor 40 to execute one or more programs stored in the memory 38 suitable for sensing system 10 conditions via the sensors 42 and for adjusting various parameters of the system 10 via the actuators 44 based on the user inputs. The I/O system 38 may then display several of the sensed conditions as well as the adjusted parameters. Certain components of the spray application system 10 may be included in or interface with a proportioning system 41. The proportioning system 41 may "proportion" or deliver the compounds A, B to achieve the spray 35. In this manner, the user(s) may mix and spray chemicals, such as compounds A and B, to provide for certain coatings, such as insulative spray foam.

As mentioned earlier, the pumps 12, 14 may include a certain amount of slip. It may be beneficial to measure the slip so that the proportioning system 41 may provide adjustments, such as increasing motor 24 and/or 26 speed, to more accurately produce the spray 35 even in the presence of the slip. It is to be understood that while the slip techniques described herein are described with respect to the spray application system 10 to provide context, the techniques described herein apply to pump applications in general and may be used by centrifugal pumps, positive displacement pumps, or a combination thereof, in a variety of applications.

Figure 2:
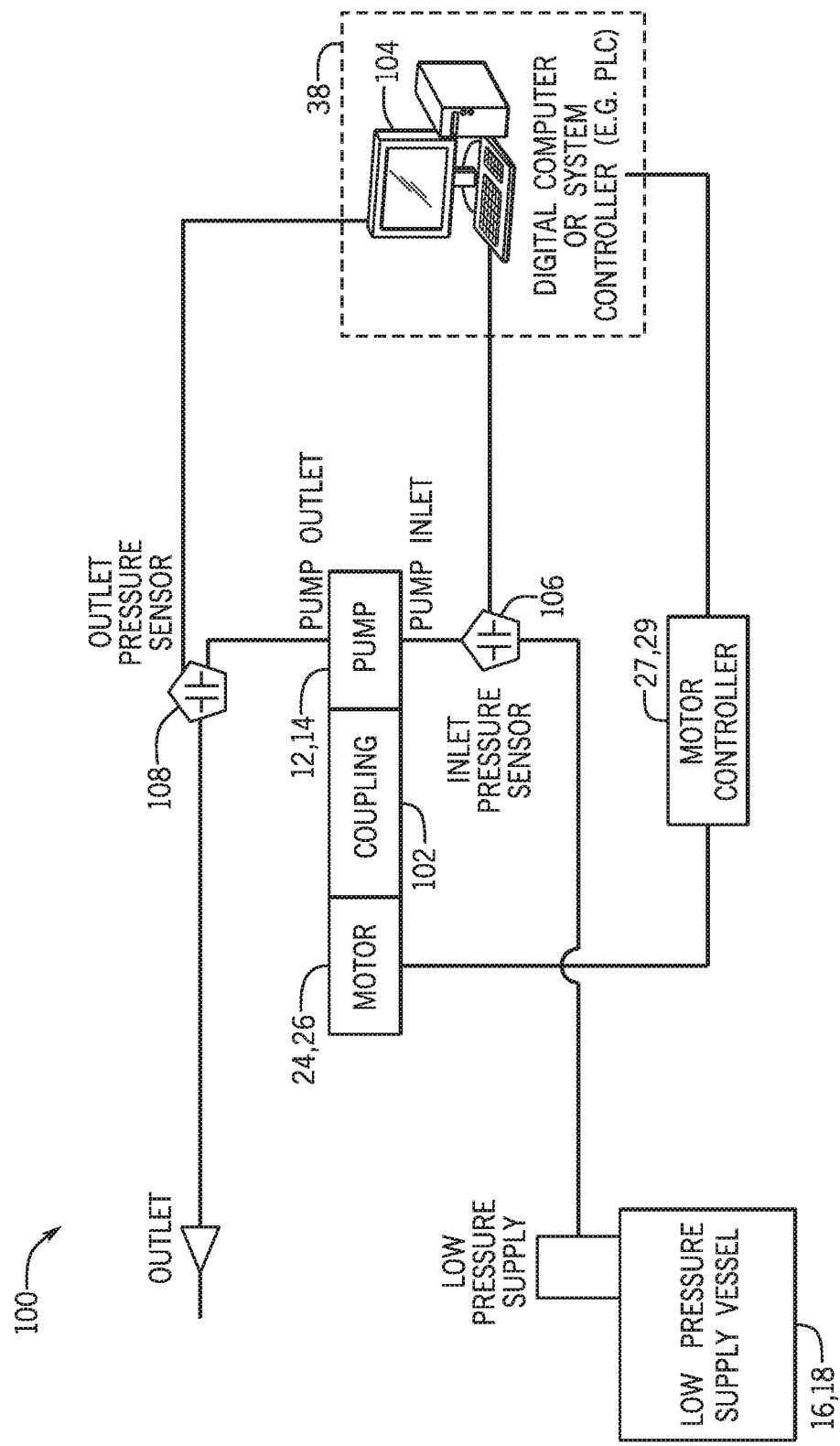
FIG. 2 is block diagram of an embodiment of a fluid system that may be included in the spray application system of FIG. 1.

Turning now to FIG. 2, the figure is a block diagram of an embodiment of a fluid system 100 that may provide for detection and/or control of pump slip. Because the figure utilizes like elements to those found in FIG. 1, the like elements are illustrated with like numbers. In the illustrated embodiment, the fluid system 100 includes a pump, such as pumps 12 or 14, mechanically coupled to a motor, such as motors 24 or 26. In the depicted embodiment, a coupling 102 may mechanically couple the motor 24 or 26 to the pump 12 or 14. A motor controller is also shown, such as motor controllers 27 or 29.

During operations, the control system 38, which may include an industrial controller 104, such as a programmable logic controller (PLC), may issue commands to the motor controller 27 or 29 to drive the motor 24 or 26, thus engaging the pump 12 or 14. Fluid (e.g., compound A or compound B) stored in tank 16 or 18 may then flow through conduit 20 or 22 into the pump 12 or 14. An inlet pressure sensor 106 (e.g., one of the sensors 42 disposed on or near the pump's inlet) may measure pressure at or near the inlet of the pump 12 or 14, and an outlet pressure sensor 108 (e.g., one of the sensors 42 disposed on or near the pump's outlet) may measure pressure at or near the outlet of the pump 12 or 14. The control system 38 may then determine and measure slip based on signals received from the sensors 106 and 108 without using flow meters or sensors.

For example, the control system 38 may use data from the pressure sensors 106, 108 to determine the leak rate of a pump in a "stalled" state. In this approach, the fluid system 100 is pressurized by the pump 12 or 14 in a closed system state (e.g. high pressure output is occluded, closed, etc.). The pump 12 or 14 is then held in a constant position (linear for piston pumps, angular for rotary pumps). By monitoring the difference between inlet and outlet pressure over time, and by knowing relevant properties of the fluid (e.g., compounds A, B) and pump 12, 14 (e.g., internal volume, size of components, type of components, and so no), the control system 38 may calculate a slip value for the pump 12 or 14. One example calculation is as follows, and derived from orifice flow theory:

$$Q(t)=Pf \times Ff \times \int \Delta P^{1/2} dt \qquad \text{Equation (1)}$$

Where Q=Slip (volume) over sample time period t, Pf=Pump Factor (experimentally measured), Ff=Fluid Factor (experimentally measured), $\Delta P=Po-Pi$, Po=Outlet pressure, and Pi=Inlet pressure.

Both Pf and Ff may be functions of temperature or other factors. The integral over the sampling time would be evaluated either via numerical methods in control software of the control system 38, and/or with digital or analog circuitry. Other theoretical or empirical calculations may be used to determine slip (Q). The calculated Q can then be used to determine slip rate for the initial $\Delta P$ or other a numerically derived resultant of $\Delta P$ (e.g. average $\Delta P$ over the sampling period, etc.).

An alternative technique to the Q(t) calculation of equation 1 involves determining the displacement of the pump 12 or 14 at a zero-flow pressurized state. In this technique, the pump 12 or 14 is controlled (e.g., via control system 38) to a given outlet pressure (or $\Delta P$) in a known no-flow state. If there is slip, the control system 38 will advance the pump 12 or 14 to maintain the set outlet pressure level (or $\Delta P$). The motion of the pump 12 or 14 during this state, factored by the pump 12 or 14 displacement, can then be used to calculate the slip Q in the pump at the known conditions (pressure, temperature, fluid properties). Accordingly, pump slip may be measured without the need to use direct measurements such as flow measurements. By measuring pump slip indirectly, the techniques described herein may provide for a more robust fluid system 100 which may use more reliable and less costly sensors 42.

Figure 3:
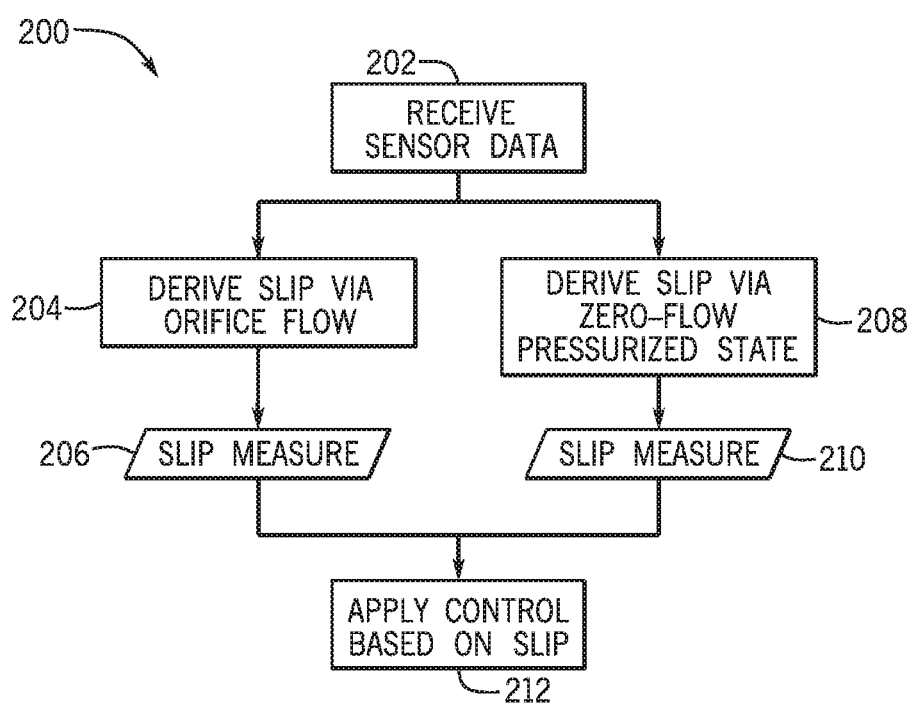
FIG. 3 is a flowchart of an embodiment of a process for slip derivation and/or control based on slip.

FIG. 3 is a flowchart of an embodiment of a process 200 that may be suitable for deriving pump slip. The process 200 may be implemented as computer code or instructions stored in them memory 38 and executable by the processor 40. In the depicted embodiment, the process 200 may receive (block 202) data from one or more of the sensors 42, including the pressure sensors 106, 108. As mentioned earlier, the pressure sensor 106 may be a pump inlet pressure sensor while the pressure sensor 108 may be a pump outlet pressure sensor.

The process 200 may then use the received data to derive (block 204) slip 206 via orifice flow derivations and/or to derive (block 208) slip 210 via zero-flow pressurized state techniques. As mentioned earlier, the slip measure 206 may be derived via the equation $Q(t)=Pf \times Ff \times \int \Delta P^{1/2} dt$ using data from pressure sensors 106, 108. Also as mentioned above, the slip measure 210 may be derived by setting the pump 12 or 14 to a no-flow state with an outlet pressure (or $\Delta P$). Slip measure 110 may then be derived base on advancing the pump 12 or 14 to maintain the set outlet pressure in this no-flow state. The slip measure 206 and/or the slip measure 210 may then be used for control (block 212). For example, the control system 36 may increase motor 24 or 26 speed and/or torque to minimize or eliminate issues due to slip 206, 210.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
one or more fluid pumps;
a first pressure sensor disposed on or near an inlet of a fluid pump of the one or more fluid pumps;
a second pressure sensor disposed on or near an outlet of the fluid pump;
a second fluid pump, wherein the fluid pump is configured to deliver an A compound to a foam dispensing gun and the second fluid pump is configured to deliver a B compound to the foam dispensing gun; and
a control system comprising a processor configured to:
receive a first signal from the first pressure sensor;
receive a second signal from the second pressure sensor;
derive a pump slip measure based on the first signal and the second signal; and
derive the pump slip measure via an orifice flow analysis.

2. The system of claim 1, wherein the processor is configured to perform the orifice flow analysis by calculating a slip Q where $Q(t)=Pf \times Ff \times \int \Delta P^{1/2} dt$ such that t comprises a sample time period, Pf=Pump Factor, Ff=Fluid Factor, $\Delta P=Po-Pi$, wherein Po=Outlet pressure of the fluid pump, and Pi=Inlet pressure of the fluid pump.

3. The system of claim 1, wherein the processor is configured to derive the pump slip measure via a zero-flow pressurized state.

4. The system of claim 3, wherein the processor is configured to control the fluid pump to a set outlet pressure in a known no-flow state to arrive at the zero-flow pressurized state.

5. The system of claim 4, wherein the processor is configured to derive the pump slip measure by measuring an advancing of the fluid pump to maintain the set outlet pressure.

6. The system of claim 1, wherein the fluid pump and the second fluid pump are configured to deliver the A and the B compounds at the same pressure to the foam dispensing gun.

7. The system of claim 1, comprising a first heated conduit fluidly coupling the fluid pump to the foam dispensing gun, and a second heated conduit fluidly coupling the second fluid pump to the foam dispensing gun.

8. The system of claim 7, wherein the processor is configured to control heat in the first heated conduit, in the second heated conduit, or in a combination thereof, to deliver the A and the B compounds at the same pressure to the foam dispensing gun.

9. A method, comprising:
receiving a first signal from a first pressure sensor, wherein the first pressure sensor is disposed on or near an inlet of one or more fluid pumps;
receiving a second signal from a second pressure sensor, wherein the second pressure sensor is disposed on or near an outlet of the one or more fluid pumps;
using a second fluid pump, wherein the fluid pump is configured to deliver an A compound to a foam dispensing gun and the second fluid pump is configured to deliver a B compound to the foam dispensing gun; and deriving a pump slip measure based on the first signal and the second signal, wherein deriving the pump slip measure comprises performing an orifice flow analysis and wherein performing the orifice flow analysis comprises calculating a slip Q where $Q(t)=Pf \times Ff \times \int \Delta P^{1/2} dt$ such that t comprises a sample time period, Pf=Pump Factor, Ff=Fluid Factor, $\Delta P$=Po−Pi, wherein Po=Outlet pressure of the fluid pump, and Pi=Inlet pressure of the fluid pump.

10. The method of claim 9, wherein deriving the pump slip measure comprises applying a zero-flow pressurized state.

11. The method of claim 10, wherein applying the zero-flow pressurized state comprises controlling the fluid pump to a set outlet pressure in a known no-flow state to arrive at the zero-flow pressurized state.

12. A tangible, non-transitory, computer-readable medium comprising instructions that when executed by a processor cause the processor to:

receive a first signal from a first pressure sensor, wherein the first pressure sensor is disposed on or near an inlet of one or more fluid pumps;

receive a second signal from a second pressure sensor, wherein the second pressure sensor is disposed on or near an outlet of the one or more fluid pumps;

control a second fluid pump, wherein the fluid pump is configured to deliver an A compound to a foam dispensing gun and the second fluid pump is configured to deliver a B compound to the foam dispensing gun; and derive a pump slip measure based on the first signal and the second signal wherein the instructions that cause the processor to derive the pump slip measure comprise instructions that cause the processor to perform an orifice flow analysis, and wherein the instructions that cause the processor to perform the orifice flow analysis comprise instructions that cause the processor to calculate a slip Q where $Q(t)=Pf \times Ff \times \int \Delta P^{1/2} dt$ such that t comprises a sample time period, Pf=Pump Factor, Ff=Fluid Factor, $\Delta P$=Po−Pi, wherein Po=Outlet pressure of the fluid pump, and Pi=Inlet pressure of the fluid pump.

13. The medium of claim 12, wherein the instructions that cause the processor to derive the pump slip measure comprise instructions that cause the processor to apply a zero-flow pressurized state.

14. The medium of claim 13, wherein the instructions that cause the processor to apply the zero-flow pressurized state comprise the instructions that cause the processor to control the fluid pump to a set outlet pressure in a known no-flow state to arrive at the zero-flow pressurized state.

15. A tangible, non-transitory, computer-readable medium comprising instructions that when executed by a processor cause the processor to:

receive a first signal from a first pressure sensor, wherein the first pressure sensor is disposed on or near an inlet of one or more fluid pumps;

receive a second signal from a second pressure sensor, wherein the second pressure sensor is disposed on or near an outlet of the one or more fluid pumps;

control a second fluid pump, wherein the fluid pump is configured to deliver an A compound to a foam dispensing gun and the second fluid pump is configured to deliver a B compound to the foam dispensing gun; and derive a pump slip measure based on the first signal and the second signal, wherein the instructions that cause the processor to derive the pump slip measure comprise instructions that cause the processor to apply a zero-flow pressurized state.

\* \* \* \* \*